Figure 1:
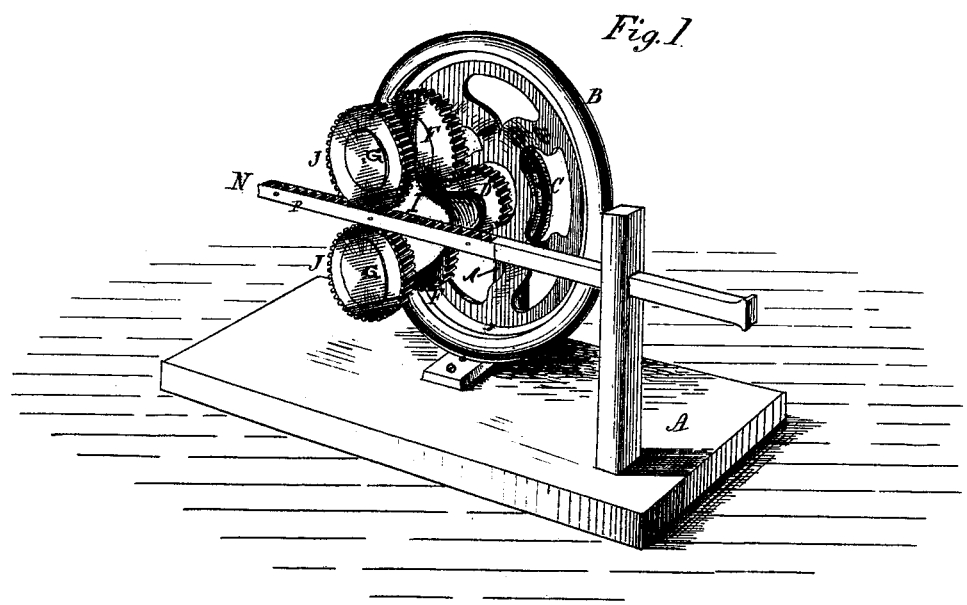

A. G. SMYTH.
Device for Converting Motion.

No. 202,880. Patented April 23, 1878.

3 Sheets—Sheet 1.

Witnesses

Inventor.

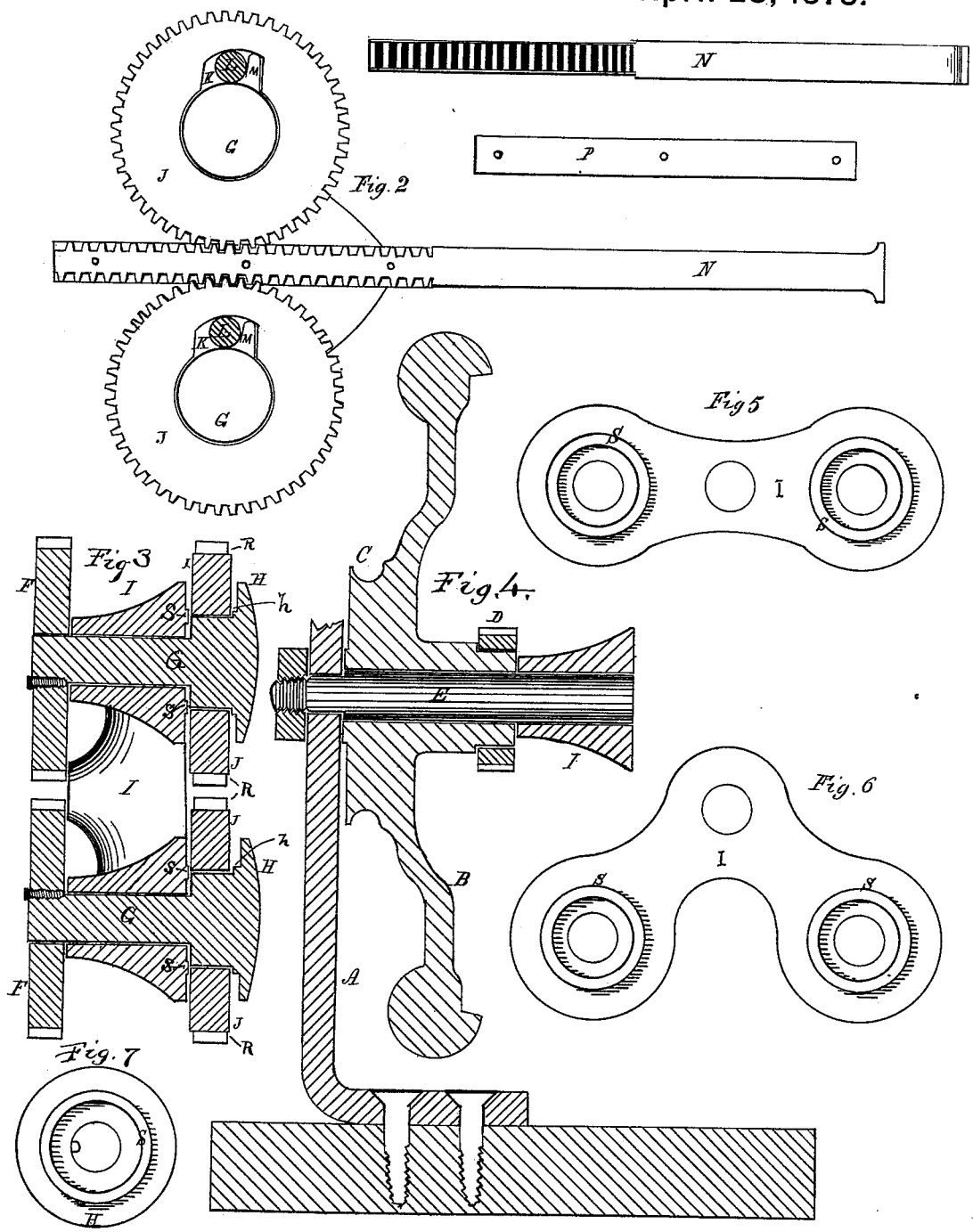

A. G. SMYTH.
Device for Converting Motion.
No. 202,880.  Patented April 23, 1878.
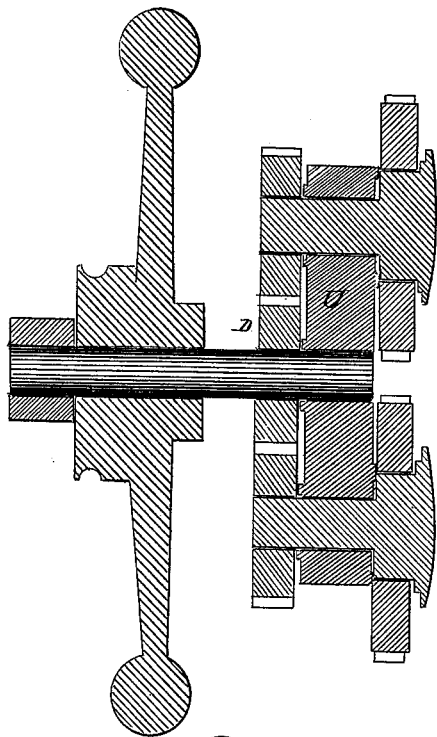
Fig. 8.
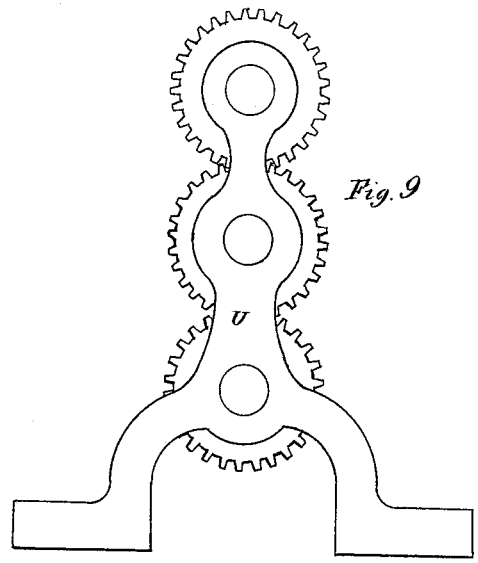
Fig. 9.
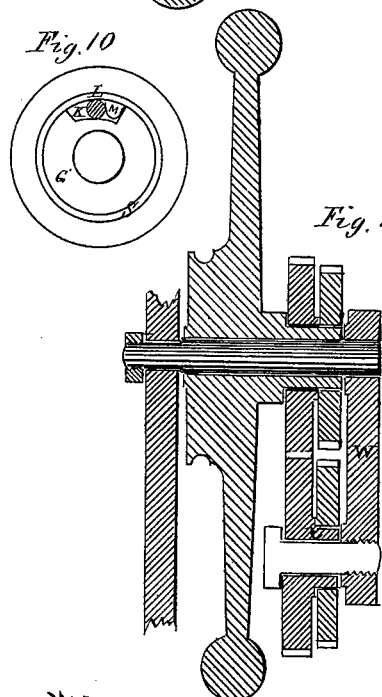
Fig. 10.
Fig. 11.
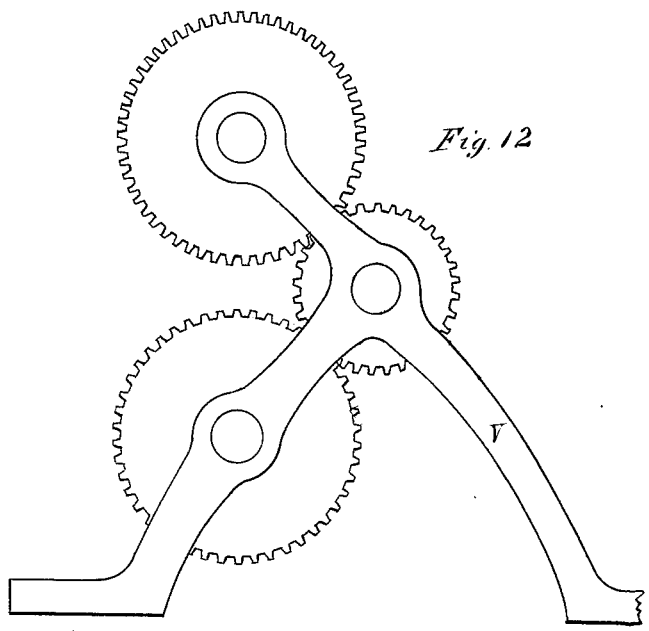
Fig. 12.
Witnesses  Inventor.

UNITED STATES PATENT OFFICE.

ABSALOM G. SMYTH, OF HAMILTON, ONTARIO, CANADA.

IMPROVEMENT IN DEVICES FOR CONVERTING MOTION.

Specification forming part of Letters Patent No. 202,880, dated April 23, 1878; application filed July 14, 1877.

*To all whom it may concern:*

Be it known that I, ABSALOM GRIFFIN SMYTH, of the city of Hamilton, in the county of Wentworth, in the Province of Ontario, Canada, have invented certain new and useful Improvements in Devices for Converting Reciprocating Motion into Rotary; and I do hereby declare that the following is a full, clear, and exact description of the construction and operation of the same.

The object of the invention is to provide a simple, more effective, and comparatively inexpensive device for driving various machines or parts of machinery that require reciprocating motion to be converted into rotary. It transmits power continuously at what may be called the best points of the crank. Consequently there is no dead-center to overcome, and for some purposes the fly-wheel may be dispensed with. It can be applied to machines running with treadles, and the operator has better control of the machine with the foot, so far as applying power is concerned, which is a great advantage in sewing-machines, and easily applied by connecting the rack with the treadle.

In steam-engines the rack and piston-rod may consist of one piece, one end being attached direct to the piston inside of the cylinder, which will dispense with the cross-head, slides, and connecting-rods, the motive power acting in a direct line to the crank-leverage, which is not the case when transmitted through the connecting-rod.

The device consists in the combination of cog or gear wheels, two having locking devices; also, a rack having cogs cut upon its two sides, facing opposite directions, for driving the wheels.

By reference to the accompanying drawings it will be seen that Figure 1 is a perspective view of the device represented as attached for convenience to a block. Fig. 2 is a side view of the lock cogged pulleys with flanges detached, also the rack for operating them, having one of its side pieces removed. Fig. 3 represents a section of the same. Fig. 4 represents a section through the center of drive-wheel. Fig. 5 shows the block to which the gears are attached, having the holes placed in a direct line. Fig. 6 represents the same block in a crooked form, with the holes placed out of line. Fig. 7 is an end view of shaft G from the inner end. Figs. 8, 9, 10, 11, and 12 represent some of the modifications set forth in the specification.

A is the frame-work, which may be of any suitable form and strength, according to the amount of power required to be employed.

B is a fly or drive wheel, provided with a groove-pulley, C, for transmitting power by belt, and upon the opposite side is attached a gear-wheel, D, said fly-wheel being mounted on the spindle or pin E, and revolving loosely thereon, one end of said pin being securely attached to the frame-work.

F F are two gear-wheels, each fastened on the ends of their respective shafts G G with screw-pins, and so arranged as to mesh into the gear-wheel D, and act, in connection with the lock-wheels J J, to convey power alternately to wheel D.

The two shafts G G are held in position by the block I. Said block, in light-running machinery, may be attached to one end of pin E, which carries the fly or drive wheel, in order that the same shall be retained in position while sustaining the necessary wheels to form a connection between the rack N and fly or drive wheel for converting motion.

Upon the outer ends of the two shafts G G are fitted two gear-wheels, J J, one on each, to revolve thereon, and are retained there upon one side by the flanges H H, attached or formed on the ends of said shafts, the other side being retained by the block I. These portions of the shafts upon which J J are placed are made larger in diameter than the parts that pass through the block I, thereby forming a shoulder, which prevents the said wheels from being pressed tightly between block I and flanges H H; also, it gives more surface for the locking device to act upon. The said two gear-wheels J J each contain a recess, K, to receive rollers L L and springs M M. The bottoms of said recesses are circular in form, to correspond with the shaft, and, being slightly drawn in toward the shaft at one end, will cause the roller, when pushed in one direction, to wedge in between the shaft and the bottom of the recess, thereby locking the gear-wheels fast to the shaft, and when pushed in the opposite direction it will loosen and allow the gear-wheel to revolve again upon its shaft. It will be observed that the length of rollers should be slightly less than the thickness of wheels J J, and placed lengthwise of the shaft.

Flat springs are used, nearly the width of the thickness of gear-wheels in which they are placed, and are bent U-shaped, leaving one prong longer than the other, and placed in the deepest end of recess, the upper end being next to the shaft with short prong bearing against the roller, which will prevent the shaft from interfering with the flexibility of the spring, thereby keeping the roller in position, so that when the gear-wheel is rotated in one direction it will immediately lock fast to the shaft, and a reverse movement of the wheel will cause the roller to loosen itself and allow the gear-wheel to revolve on its shaft, thereby making the locking device automatic.

Annular projections are formed on the block I and flanges H H, to diminish the friction-surfaces, as shown by letters S h. A single stem-rack, N, having cogs upon two sides, facing opposite directions, is used to rotate back and forth the lock-wheels J J, which are placed facing each other, and at a proper distance apart to receive said rack between them, so that the cogs of rack and cog-wheels mesh into each other.

Placing the two lock gear-wheels on separate shafts provides for the use of this construction of rack, which is simple and can be produced at small cost, is very effective and durable for rotating simultaneously the two lock gear-wheels in opposite directions, thereby causing power to be transmitted alternately through them, thence through the shafts G G and gear-wheels F F, which has the effect of transmitting continuous power to the gear-wheel D; and any kind of motive power being applied to the rack N, so as to give it a reciprocating movement, will impart to the fly or drive wheel B a continuous rotary motion in one direction.

The rack is provided with two thin metal pieces, P P, which are about the same length as the rows of cogs, and are attached to the sides of the toothed end of the rack, and so fitted that the edges of said pieces extend to the face end of the cogs, thereby serving as guides, for the purpose of keeping the said rack in position while moving back and forth between the two gear-wheels J J. Annular recesses R are formed upon the sides and outer circumference of the lock gear-wheels, in which the guides or sides of rack travel, which, if properly fitted, will govern the depth that the cogs mesh into each other, also allow the gear-wheels J J to run closer to block I, and provide for a difference between the width of cogs and length of rollers used for locking device, which gives more surface to retain the lock gear-wheels fast to their respective shafts, which, in some cases, is of advantage.

The block I, in some cases, may be made straight, but in others requires to be crooked sufficient that gear-wheels F may be larger in diameter than the gear-wheel D, in order to increase the speed of the fly-wheel without increasing the speed of the rack, and permit the two lock gear-wheels to be of suitable diameter to give desirable leverage in transmitting the power from rack N, and at the same time bring them sufficiently near each other to receive between them a light-constructed rack to rotate them; but when not desirable to make such increase of speed, the gear-wheels F F and D may be of one diameter, which will permit the block I to be a straight piece, as shown in Fig. 5.

Slight modifications of the device may be described as follows: In place of having the fly-wheel revolve loosely upon a pin, it may be mounted upon a shaft, and made fast thereto, and the gear-wheel D attached to the same shaft, two ordinary bed-pieces or portions of a frame being employed to support the same; and in place of the block I, one or both of said pieces may be so formed as to hold in position the shafts G G, as shown in Fig. 8. Also, in place of the recesses K being formed in the lock-wheels J J, they may be made in the shafts G G, so that the rollers used for locking device may having a bearing against the inner surface of said wheels that travel in contact with their (as shown in Fig. 10) respective shafts.

In place of the rack N being worked between lock-wheels J J, the various wheels may be so arranged that it can be used between gear-wheels F F, or between one of the lock-wheels and one of the other gear-wheels, to rotate them back and forth.

In place of both shafts G G being employed, only one may be used by placing one of the lock-wheels J upon the drive-wheel, or upon its shaft, as shown in Fig..11, in which case only one of the gear-wheels F will be required, and only a part of the block I needed to support the one shaft or pin, as shown in Fig. 11.

Another change may be made, and do away with both shafts G G, by forming a shank on and projecting from one side of gear-wheels F F, as shown by t in Fig. 11, one on each, of suitable size to receive lock-wheels J J, the locking device having a bearing on said shank, and placing the wheels F F on separate pins, so as to revolve on them, which may be attached to any convenient part of a frame-work, or to a bed-piece, which carries the shaft of fly or drive wheel; and in some cases, where only one of the wheels F is used, it may be placed on a pin formed on or attached to block I, as shown at Fig. 11.

And be it understood that in all these modifications the rack N can be used in the same form and manner, and with the same results as regards converting reciprocating motion into rotary, which, in some kinds of machinery, has its advantages; for the said rack N, working between two gear-wheels, admits of its having a vibrating reciprocating movement, as well as rectilinear reciprocating.

What I claim as my invention is—

1. In combination with the reciprocating rack-bar N, the two wheels J J gearing with said bar, mounted upon the shafts G G, and each provided with rolling locks L, placed in the eccentric recess K, and the spring M, as set forth and described.

2. The block I, provided with bearings for the two shafts G G, whereon are mounted the wheels F and J, supported by the spindle E of the wheel B, as set forth.

3. The wheel B, mounted upon the spindle E, and provided with the pinion D, combined with the wheels F and shafts G, coupled as shown and described, and the reciprocating rack-bar N, whereby said wheels F F are alternately rotated, and their motion communicated to said wheel B, as described.

4. The wheel J, turning upon the shaft G, and provided with the eccentric recess K, combined with the roller L and flat U-shaped spring, as shown and described.

5. The wheel J, provided with the eccentric recess K, and the roller L placed therein, combined with the U-shaped spring M, one blade of which is longer than the other, as and for the purpose set forth.

6. The wheel J, combined with the shaft G, constructed with a head, H, and shoulder $h$ below said head, and the block I, provided with the annular shoulders S, for the purpose of reducing friction, as set forth.

ABSALOM GRIFFIN SMYTH.

In presence of—
  WM. BRUCE,
  A. KINGDON.